(12) United States Patent
Kim et al.

(10) Patent No.: US 8,761,105 B2
(45) Date of Patent: Jun. 24, 2014

(54) APPARATUS AND METHOD FOR PERFORMING HARQ PROCEDURE

(75) Inventors: Jeong Ki Kim, Anyang-si (KR); Young Soo Yuk, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 13/390,926

(22) PCT Filed: Aug. 18, 2010

(86) PCT No.: PCT/KR2010/005467
§ 371 (c)(1),
(2), (4) Date: Feb. 16, 2012

(87) PCT Pub. No.: WO2011/021853
PCT Pub. Date: Feb. 24, 2011

(65) Prior Publication Data
US 2012/0147832 A1    Jun. 14, 2012

Related U.S. Application Data

(60) Provisional application No. 61/234,637, filed on Aug. 18, 2009, provisional application No. 61/237,704, filed on Aug. 28, 2009.

(30) Foreign Application Priority Data

May 12, 2010   (KR) .................. 10-2010-0044249

(51) Int. Cl.
*H04W 4/00*        (2009.01)
*H04W 28/16*       (2009.01)
*H04W 16/06*       (2009.01)

(52) U.S. Cl.
CPC .................. *H04W 28/16* (2013.01); *H04W 16/06* (2013.01)
USPC .......................... 370/329; 370/341

(58) Field of Classification Search
CPC ...... H04W 28/16; H04W 16/06; H04W 16/10
USPC .......... 370/216, 260, 329, 336, 338, 352, 341
See application file for complete search history.

(56) References Cited

U.S. PATENT DOCUMENTS

| | | | |
|---|---|---|---|
| 2007/0165731 A1* | 7/2007 | Xiao et al. ..................... | 375/260 |
| 2007/0211662 A1* | 9/2007 | Hyon et al. .................... | 370/329 |
| 2008/0209301 A1* | 8/2008 | Chang et al. .................. | 714/749 |
| 2009/0080397 A1* | 3/2009 | Kim et al. ..................... | 370/338 |

(Continued)

FOREIGN PATENT DOCUMENTS

| | | |
|---|---|---|
| CN | 101057409 | 10/2007 |
| CN | 101084695 | 12/2007 |

(Continued)

*Primary Examiner* — Hassan Phillips
*Assistant Examiner* — Ajay Cattungal
(74) *Attorney, Agent, or Firm* — Lee, Hong, Degerman, Kang & Waimey

(57) ABSTRACT

A apparatus and method for efficiently performing an HARQ procedure in a wireless communication system are disclosed. According to the method for performing an HARQ procedure, waste of unnecessary resources caused by continuous failure in packet transmission can be avoided, wherein the failure occurs due to the error of the uplink basic assignment A-MAP IE for retransmission.

8 Claims, 8 Drawing Sheets

(56) References Cited

U.S. PATENT DOCUMENTS

| | | | |
|---|---|---|---|
| 2009/0323620 A1* | 12/2009 | Kim et al. | 370/329 |
| 2010/0199140 A1* | 8/2010 | Lee et al. | 714/749 |
| 2010/0202373 A1* | 8/2010 | Chun et al. | 370/329 |
| 2010/0232398 A1* | 9/2010 | Lim et al. | 370/336 |
| 2010/0246511 A1* | 9/2010 | Kim et al. | 370/329 |
| 2010/0272047 A1* | 10/2010 | Zhu et al. | 370/329 |
| 2012/0093103 A1* | 4/2012 | Lee et al. | 370/329 |
| 2012/0099556 A1* | 4/2012 | Kim et al. | 370/329 |
| 2012/0147734 A1* | 6/2012 | Kim et al. | 370/216 |
| 2013/0188585 A1* | 7/2013 | Sun et al. | 370/329 |

FOREIGN PATENT DOCUMENTS

| | | |
|---|---|---|
| JP | 2009-152943 | 7/2009 |
| KR | 1020060083935 | 7/2006 |
| KR | 1020070103649 | 10/2007 |
| KR | 1020090031235 | 3/2009 |
| KR | 1020090072607 | 7/2009 |
| WO | 2009/025466 | 2/2009 |

* cited by examiner

APPARATUS AND METHOD FOR PERFORMING HARQ PROCEDURE

This application is the National Stage filing under 35 U.S.C. 371 of International Application No. PCT/KR2010/005467, filed on Aug. 18, 2010, which claims the benefit of earlier filing date and right of priority to Korean Application No. 10-2010-0044249, filed on May 12, 2010, and also claims the benefit of U.S. Provisional Application Ser. Nos. 61/237,704, filed on Aug. 28, 2009, and 61/234,637, filed on Aug. 18, 2009, the contents of which are all incorporated by reference herein in their entirety.

TECHNICAL FIELD

The present invention relates to a wireless communication system, and more particularly, to a method and apparatus performing an HARQ procedure.

BACKGROUND ART

Hybrid Automatic Retransmission request (HARQ) means an improved automatic retransmission request scheme where originally transmitted information and retransmitted information are decoded in combination to reduce the number of retransmission times according to an error occurring in initial data transmission. This HARQ scheme is used for an IEEE 802.16m system and other mobile communication system. Hereinafter, a method for allocating resources for uplink HARQ in an IEEE 802.16 system according to the related art will be described in brief.

A mobile station which has received an uplink basic assignment A-MAP information element (A-MAP IE) transmits sub-packets of HARQ data through resources allocated by the uplink basic assignment A-MAP IE. A base station attempts to decode a data burst, and if decoding is successfully performed, the base station transmits an acknowledgement (ACK) signal. However, if decoding is failed, the base station transmits a negative acknowledgement (NACK) to the mobile station. When the base station allocates resources to the mobile station for retransmission, it may not transmit the uplink basic assignment A-MAP. In this case, the base station allocates resources to the mobile station at the same position and size as those of a region allocated for a previous sub-packet at a subframe for retransmission. If the base station transmits the uplink basic assignment A-MAP to the mobile station to allocate resources for retransmission, it allocates resources to a region indicated by the corresponding A-MAP.

The mobile station which has received a NACK signal from the base station performs a retransmission procedure. If the mobile station fails to receive the uplink basic assignment A-MAP IE for HARQ data burst transmission through the retransmission procedure, it transmits next sub-packet to the base station through resources allocated during transmission of the last sub-packet having same ACID.

FIG. 1 is a diagram illustrating an example of an uplink HARQ procedure.

Referring to FIG. 1, the base station transmits an uplink basic assignment A-MAP IE to the mobile station, wherein the uplink basic assignment A-MAP IE indicates that uplink resources for data transmission of the mobile station have been allocated to a region A (S110). The mobile station which has received the uplink basic assignment A-MAP IE from the base station transmits sub-packets of HARQ burst through a resource region (region A) indicated by the corresponding IE (S120). If the base station fails to decode the packets due to an error occurring in the packets transmitted from the mobile station, it transmits a NACK signal to the mobile station to indicate the fact that an error has occurred in the transmitted packets (S130). Afterwards, the base station allocates to the mobile station resources having the same position and size as those of resources for transmission of a packet, in which the error has last occurred, without uplink basic assignment A-MAP, so that the mobile station retransmits the packet having an error at the designated time (S140).

If the mobile station receives the NACK signal from the base station but fails to receive the uplink basic assignment A-MAP IE for retransmission, it transmits retransmission packets using a region (region A) having the same position and size as those of a resource region last transmitted (S150). Then, the base station transmits an ACK signal to the mobile station in response to the retransmission packets if it normally receives the packets retransmitted from the mobile station through the allocated region A (S160). In this way, the base station can allocate the region having the same position and size as those of the resource region last transmitted from the mobile station, so that the mobile station can retransmit the packets having an error.

FIG. 2 is a diagram illustrating another example of an uplink HARQ procedure.

Referring to FIG. 2, in the same manner as FIG. 1, the base station transmits an uplink basic assignment A-MAP IE to the mobile station, wherein the uplink basic assignment A-MAP IE indicates that uplink resources for data transmission of the mobile station have been allocated to a region A (S210). The mobile station which has received the uplink basic assignment A-MAP IE from the base station transmits sub-packets of HARQ burst through a resource region (region A) indicated by the corresponding IE (S220). If the base station fails to decode the packets due to an error occurring in the packets transmitted from the mobile station, it transmits a NACK signal to the mobile station to indicate the fact that the error has occurred in the transmitted packets (S230).

Afterwards, the base station allocates the uplink basic assignment A-MAP IE to the mobile station to allocate resources having information (for example, different position or different size) different from that of resources most recently allocated for corresponding ACID, so that the mobile station retransmits the packets having an error at the designated time (S240). If the mobile station receives the NACK signal and the uplink basic assignment A-MAP IE for retransmission, it transmits retransmission packets to a resource region (region B) indicated by the corresponding A-MAP IE (S250).

Then, the base station transmits an ACK signal to the mobile station in response to the retransmission packets if it normally receives the packets retransmitted from the mobile station through the allocated region B (S260). In this way, the base station can allocate a new uplink resource region (region B) to the mobile station, so that the mobile station can retransmit the packets having an error.

In order to allocate resources for packet retransmission of the mobile station due to an error occurring in the packets transmitted from the mobile station, the base station can transmit the uplink basic assignment A-MAP IE to the mobile station. At this time, if the mobile station fails to decode the uplink basic assignment A-MAP IE, it transmits retransmission sub-packets to the base station through resources allocated to the sub-packet most recently transmitted for same ACID. In this case, ACID represents HARQ channel identifier.

Since the sub-packets transmitted by the mobile station are transmitted a wrong resource region, a problem occurs in that the sub-packets collide with packets transmitted from another mobile station. As a result, the base station fails to receive the packets transmitted from another mobile station. Also, the base station fails to receive retransmission packets from the corresponding mobile station through the resource region indicated by the uplink basic assignment A-MAP IE, and transmits NACK to the mobile station. Afterwards, if the base station allocates resources for retransmission without transmitting the uplink basic assignment A-MAP IE, the mobile station will continuously transmit retransmission packets using the wrong resource region. For this reason, waste of resources becomes serious.

DISCLOSURE OF INVENTION

Technical Problem

Accordingly, the present invention is directed to an apparatus and method for performing an HARQ procedure, which substantially obviates one or more problems due to limitations and disadvantages of the related art.

An object of the present invention is to provide a method for performing an HARQ procedure.

Another object of the present invention is to provide an apparatus for performing an HARQ procedure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution To Problem

To achieve these objects and other advantages and in accordance with the purpose of the invention, as embodied and broadly described herein, in one aspect of the present invention, a method for performing a hybrid automatic retransmission (HARQ) procedure at a base station of a wireless communication system comprises transmitting first control information to a mobile station, the first control information including information regarding a first resource region allocated for data retransmission of the mobile station; and transmitting second control information to the mobile station, the second control information including information regarding a second resource region allocated for data retransmission of the mobile station, if a signal is not received from the mobile station through the first resource region.

At this time, the method further comprises transmitting a negative acknowledgement (NACK) signal to the mobile station if the signal is not received from the mobile station through the first resource region. Also, the first resource region has a size or an allocation position different from that of the second resource region.

In another aspect of the present invention, a method for performing a hybrid automatic retransmission (HARQ) procedure at a base station of a wireless communication system comprises transmitting first control information to a mobile station, the first control information including a first HARQ sub-packet identifier value for new packet transmission of the mobile station; detecting an uplink packet corresponding to the first control information from the mobile station; and transmitting second control information to the mobile station, the second control information including the first HARQ sub-packet identifier value, if the uplink packet is not detected.

At this time, the method further comprises decoding an uplink packet corresponding to the second control information by using the first HARQ sub-packet identifier value if the uplink packet corresponding to the second control information is received.

Also, the method further comprises transmitting a negative acknowledgement (NACK) signal to the mobile station if the uplink packet is not detected.

In still another aspect of the present invention, a base station apparatus for performing a hybrid automatic retransmission (HARQ) procedure in a wireless communication system comprises a processor allocating a resource region for data retransmission of a mobile station; a first transmitting module transmitting first control information to the mobile station, the first control information including information regarding a first resource region allocated for data retransmission of the mobile station by the processor; and a second transmitting module transmitting second control information to the mobile station if a signal is not received from the mobile station through the first resource region, the second control information including information regarding a second resource region allocated for data retransmission of the mobile station by the processor.

The base station apparatus further includes a third transmitting module transmitting a negative acknowledgement (NACK) signal to the mobile station if the signal is not received from the mobile station through the first resource region.

In further still another aspect of the present invention, a base station apparatus for performing a hybrid automatic retransmission (HARQ) procedure in a wireless communication system comprises a first transmitting module transmitting first control information to a mobile station, the first control information including a first HARQ sub-packet identifier value for new packet transmission of the mobile station; a processor detecting an uplink packet corresponding to the first control information from the mobile station; and a second transmitting module transmitting second control information to the mobile station if the uplink packet is not detected, the second control information including the first HARQ sub-packet identifier value.

The processor decodes an uplink packet corresponding to the second control information by using the first HARQ sub-packet identifier value if the uplink packet for the second control information is received.

The base station apparatus further comprises a third transmitting module transmitting a negative acknowledgement (NACK) signal to the mobile station if the processor fails to receive the uplink packet.

In further still another aspect of the present invention, a method for performing a hybrid automatic retransmission (HARQ) procedure at a mobile station in a wireless communication system comprises receiving control information for uplink transmission of the mobile station from a base station; and transmitting subpacket labeled '0b00', to the base station regardless of transmission number.

At this time, the control information is an uplink basic assignment A-MAP IE (Information Element).

In further still another aspect of the present invention, a mobile station apparatus for performing a hybrid automatic retransmission (HARQ) procedure in a wireless communication system comprises a receiving module receiving control information for uplink transmission of the mobile station from a base station; a processor setting subpacket identifier (SPID) value to '0b00' regardless of transmission number; and a transmitting module transmitting the subpacket labeled '0b00', to the base station.

At this time, the control information is an uplink basic assignment A-MAP IE (Information Element).

Advantageous Effects of Invention

According to the present invention, the HARQ procedure can be performed efficiently.

According to the method for performing an HARQ procedure of the present invention, waste of unnecessary resources caused by continuous failure in packet transmission can be avoided, wherein the failure occurs due to the error of the uplink basic assignment A-MAP IE for retransmission.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. Hereinafter, the following detailed description includes detailed matters to provide full understanding of the present invention. However, it will be apparent to those skilled in the art that the present invention can be carried out without the detailed matters. For example, although the following description will be made based on a mobile communication system corresponding to an IEEE 802.16 m system, the following description can be applied to other mobile communication systems except unique features of the IEEE 802.16 m system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a mobile station designates a mobile or fixed type user terminal such as a user equipment (UE) and an advanced mobile station (AMS). It is also assumed that a base station designates a random node of a network node, such as Node B, eNode B and access point (AP), which performs communication with the mobile station.

In a mobile communication system, the mobile station can receive information from the base station through a downlink and transmit information to the base station through an uplink. Examples of information transmitted from or received in the mobile station include data and various kinds of control information. Various physical channels exist depending on types and uses of the information transmitted from or received in the mobile station.

An Advanced Air Interface (AAI) subframe used in the present invention means a structuralized data sequence of a duration previously defined and used by an AAI. Generally, the AAI subframe may be designated as a subframe. Also, an Advanced MAP (A-MAP) used in the present invention can be transmitted to the mobile station together with unicast service control information. The unicast service control information is divided into user-specific control information and non-user specific control information. The user-specific control information is sub-divided into assignment information, HARQ feedback information, and power control information.

Figure 1:
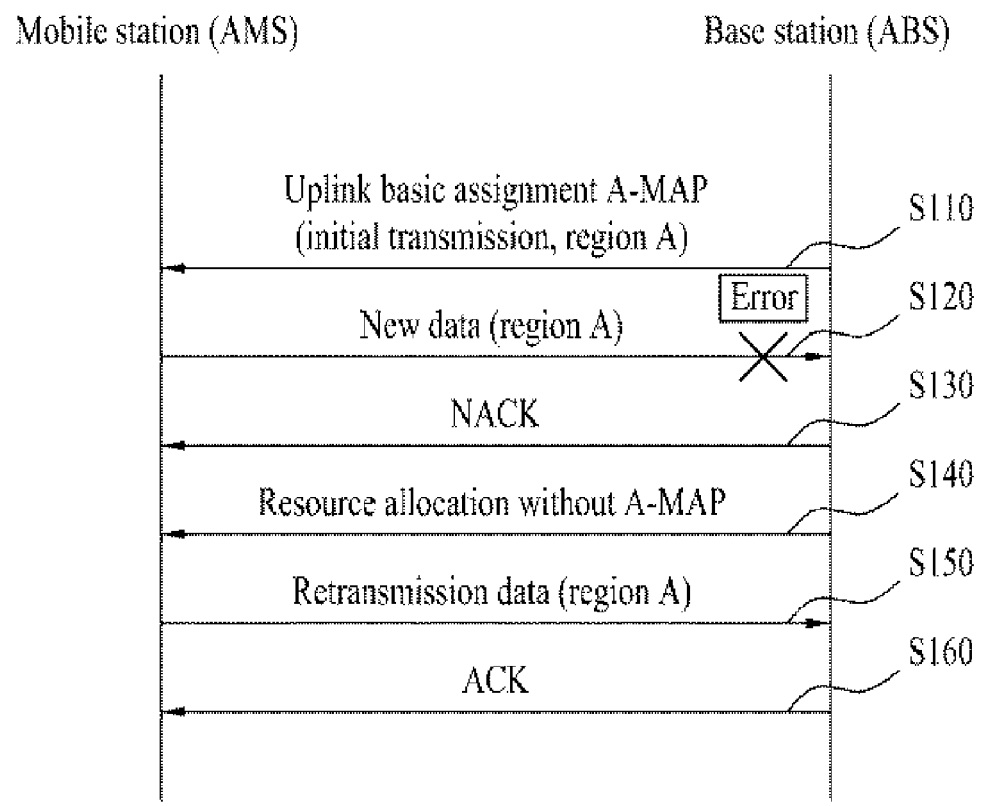
FIG. 1 is a diagram illustrating an example of an uplink HARQ procedure.
Figure 2:
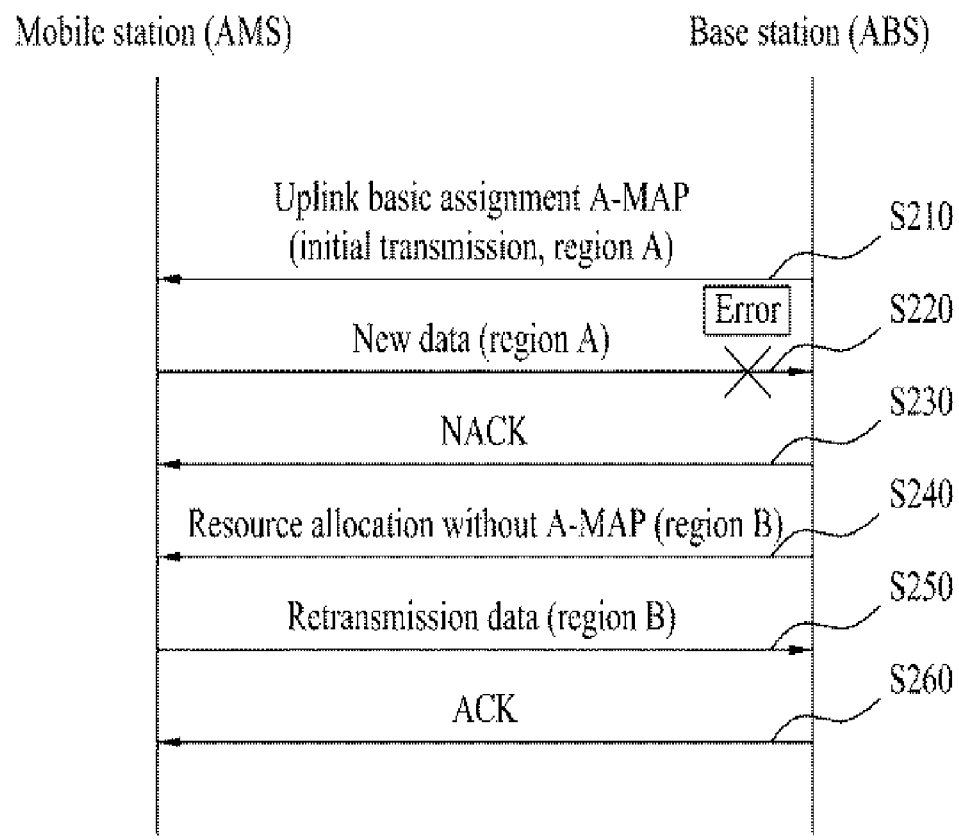
FIG. 2 is a diagram illustrating another example of an uplink HARQ procedure.
Figure 3:
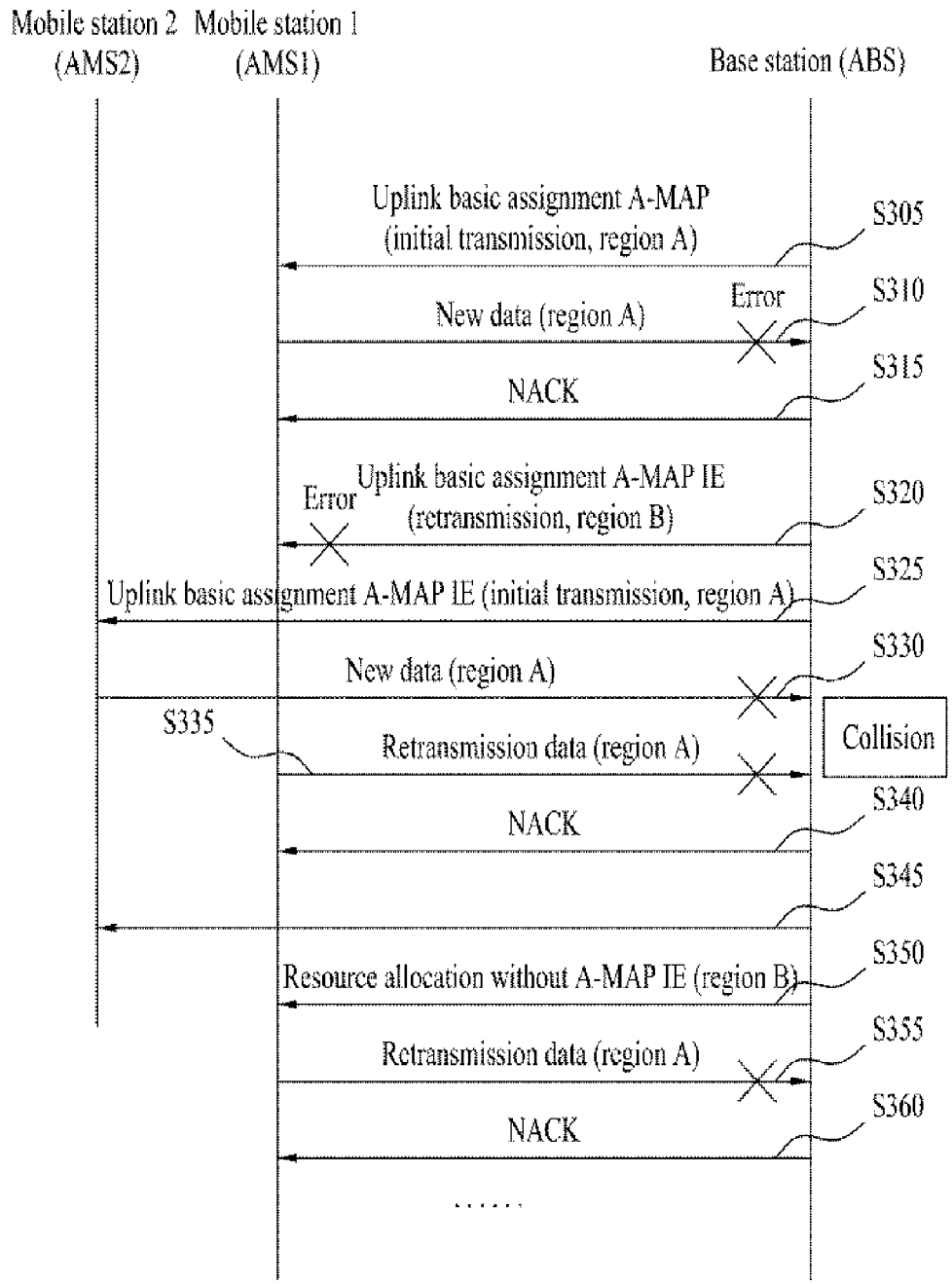
FIG. 3 is a diagram illustrating an example that a mobile station fails to receive an uplink basic assignment A-MAP IE during an HARQ retransmission procedure.

FIG. 3 is a diagram illustrating an example that a mobile station fails to receive uplink basic assignment A-MAP IE in an HARQ retransmission procedure.

Referring to FIG. 3, the base station transmits an uplink basic assignment A-MAP IE to the mobile station 1 to allocate uplink resources, wherein the uplink basic assignment A-MAP IE indicates a resource region (region A) (S305). The mobile station 1 which has received the uplink basic assignment A-MAP IE transmits sub-packets of HARQ burst through a resource region (region A) indicated by the corresponding IE (S310). If the base station fails to decode the packets due to an error occurring in the packets transmitted from the mobile station 1, it transmits a NACK signal to the mobile station 1 to indicate (or notify) the fact that an error has occurred in the transmitted packets (S315). When the base station allocates resources to the mobile station so that the mobile station retransmits the packets having an error at the designated time, it transmits the uplink basic assignment A-MAP IE to the mobile station to allocate resources having information (for example, different position or different size) different from that of resources most recently allocated for corresponding ACID (S320). The base station can allocate a resource region (region A) to the mobile station 2 for packet transmission of the mobile station 2 at the same time (S325), and the mobile station 2 transmits packets to the allocated resource region (region A) (S330).

If the mobile station 1 receives the NACK signal from the base station (S315) but fails to receive the uplink basic assignment A-MAP IE indicating a region B as a resource region for retransmission transmitted from the base station, due to the A-MAP error, it transmits retransmission packets through a resource region (region A) having the same position and size as those of a resource region most recently transmitted (S335). However, since the mobile station 1 and the mobile station 2 transmit the packets using the same region (region A) at the same time, the base station fails to receive the packets of the mobile station 2 through the region A and also fails to receive the packets of the mobile station 1 through the region B.

Accordingly, the base station transmits the NACK signal for the region B to the mobile station 1 (S340), and transmits the NACK signal for the region A to the mobile station 2 (S345). Also, the base station can allocate the specific resource region (region B) to the mobile station 1 without uplink basic assignment A-MAP IE for retransmission of the mobile station (S350). Since the mobile station transmits retransmission packets to the region A (S335), the base station determines that an error has occurred in the packets of the mobile station, and then continues to transmit the NACK signal (S360).

Then, the base station allocates the resource region for retransmission to the mobile station, and the mobile station receives the NACK signal and continues to transmit the packets to the wrong region. In other words, a problem occurs in that the steps of S350 to S360 are repeated between the base station and the mobile station 1 until the number of maximum HARQ retransmission times is exceeded or the base station transmits the uplink basic assignment A-MAP IE.

As described with reference to FIG. 3, in order to solve the continuous packet error occurring as the mobile station fails to read the uplink basic assignment A-MAP IE for retransmission, the base station allocates uplink resources for packet retransmission of the mobile station by using the uplink basic assignment A-MAP IE. Then, if the base station fails to normally receive the packets of the mobile station from the allocated resource region, it transmits the uplink basic assignment A-MAP IE to the mobile station to allocate resources for next retransmission. At this time, even if the resource allocation region has the same position and size as those of a previous allocation region, the base station can allocate resources for retransmission to the mobile station by transmitting the uplink basic assignment A-MAP IE to the mobile station.

Figure 4:
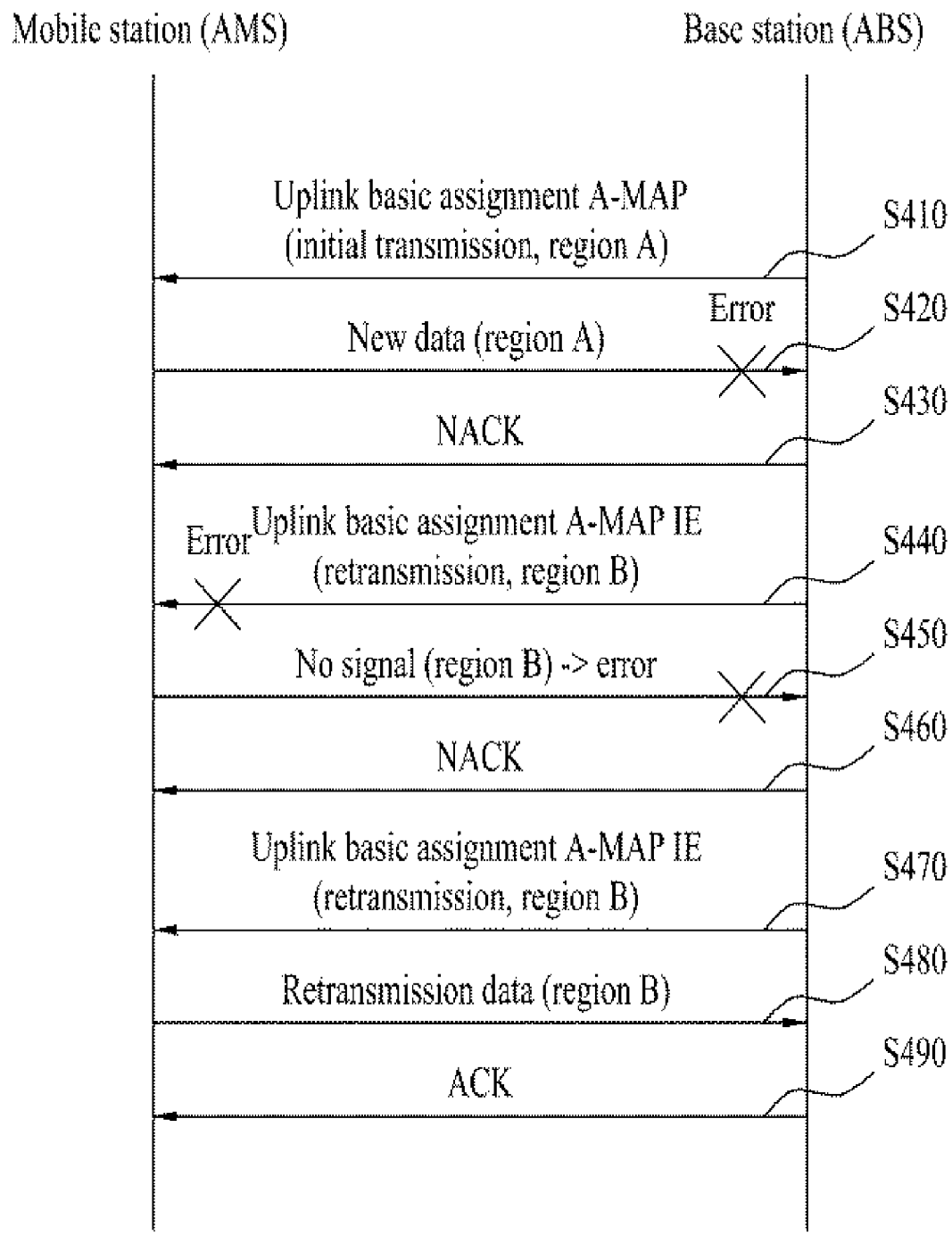
FIG. 4 is a diagram illustrating an example of a method for recovering A-MAP error at a base station when a mobile station fails to receive an uplink basic assignment A-MAP IE during an HARQ retransmission procedure.

FIG. 4 is a diagram illustrating an example of a method for recovering A-MAP error at a base station when a mobile station fails to receive an uplink basic assignment A-MAP IE in an HARQ retransmission procedure.

Referring to FIG. 4, the base station transmits an uplink basic assignment A-MAP IE to the mobile station to allocate uplink resources, wherein the uplink basic assignment A-MAP IE indicates a resource region (region A) (S410). The mobile station which has received the uplink basic assignment A-MAP IE transmits sub-packets of HARQ burst through a resource region (region A) indicated by the corresponding IE (S420). If the base station fails to decode the packets due to an error occurring in the packets transmitted from the mobile station, it transmits a NACK signal to the mobile station to indicate (or notify) the fact that an error has occurred in the transmitted packets (S430). The base station can allocate resources to the mobile station so that the mobile station retransmits the packets having an error at the designated time. At this time, the base station transmits the uplink basic assignment A-MAP IE to the mobile station to allocate resources having information (for example, different position or different size) different from that of resources most recently allocated for corresponding ACID (S440). Since scheduling is performed in a subframe unit, the NACK signal at the step S430 and the uplink basic assignment A-MAP IE at the step S440 can be transmitted to the mobile station at the same time.

If the mobile station receives the NACK signal from the base station (S430) but fails to receive the uplink basic assignment A-MAP IE indicating the region B as a resource region for retransmission transmitted from the base station, due to the A-MAP error (S440), it transmits retransmission packets through a resource region (region A) having the same position and size as those of a resource region most recently transmitted (S450). In other words, the mobile station fails to transmit the packets through the region B which is the resource region allocated by the uplink basic assignment A-MAP IE (S450). As a result, the base station determines a packet error as it has not received the packets from the mobile station through the region B (uplink burst decoding error), and transmits the NACK signal to the mobile station (S460). Since the packet error has occurred in the resource region for retransmission allocated by the uplink basic assignment A-MAP (S450), the base station allocates the resource region for retransmission by transmitting the uplink basic assignment A-MAP IE to the mobile station (S470). At this time, the base station transmits the uplink basic assignment A-MAP IE to the mobile station through the resource region for retransmission for the region B allocated through the resource region for retransmission at the step S440 (S470).

The mobile station which has received the uplink basic assignment A-MAP IE transmits retransmission data to the base station through the resource region (region B) indicated by the corresponding IE (S480). The base station which has successfully received the retransmission data through the region allocated to the uplink basic assignment A-MAP IE can transmit the ACK signal to the mobile station (S490).

As described above, if the mobile station fails to receive the uplink basic assignment A-MAP IE indicating the region B as the resource region for retransmission transmitted from the base station, due to the A-MAP error (S440), the base station transmits the uplink basic assignment A-MAP IE indicating the region B to the mobile station, whereby the problem such as repeating the step of transmitting the packets from the mobile station which has received the NACK signal to the wrong region can be solved.

After allocating uplink resources for packet retransmission of the mobile station by using the uplink basic assignment A-MAP IE, the base station can recognize that the mobile station has transmitted the packets through the allocated resource region. In other words, the base station can detect whether the packets have been transmitted from the mobile station, by performing burst decoding for the allocated resource region.

If it is determined that the mobile station has not transmitted the packets (or uplink burst), the base station transmits the uplink basic A-MAP IE to the mobile station when allocating the resources for next retransmission to the mobile station. At this time, even if the resource allocation region has the same position and size as those of a previous allocation region, the base station can allocate the resources for retransmission to the mobile station by transmitting the uplink basic assignment A-MAP IE to the mobile station. The base station can recognize whether the mobile station has transmitted the packets, through the method of measuring signal intensity (or burst power) for the resource allocation region.

Figure 5:
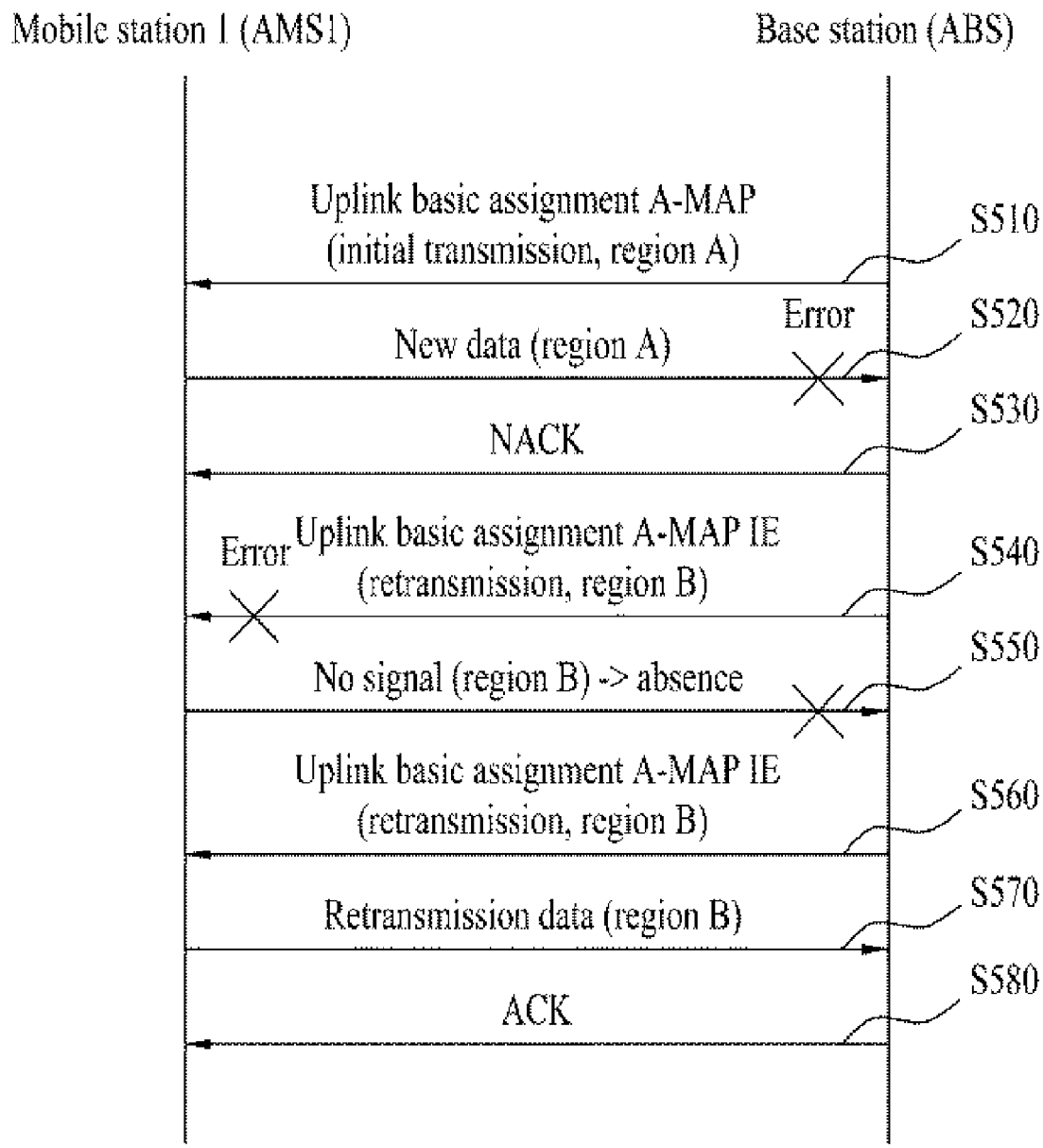
FIG. 5 is a diagram illustrating another example of a method for recovering A-MAP error at a base station when a mobile station fails to receive an uplink basic assignment A-MAP IE during an HARQ retransmission procedure.

FIG. 5 is a diagram illustrating another example of a method for recovering A-MAP error at a base station when a mobile station fails to receive an uplink basic assignment A-MAP IE in an HARQ retransmission procedure.

Referring to FIG. 5, the operation of the mobile station 1 and the base station at the steps S510 to S550 is the same as that at the steps S410 to S450. In other words, if the base station transmits an uplink basic assignment A-MAP IE to the mobile station 1 to allocate uplink resources, wherein the uplink basic assignment A-MAP IE indicates a resource region (region A) (S510), the mobile station 1 which has received the uplink basic assignment A-MAP IE transmits sub-packets of HARQ burst through a resource region (region A) indicated by the corresponding IE (S520). If the base station fails to decode the packets due to an error occurring in the packets transmitted from the mobile station 1, it transmits a NACK signal to the mobile station to indicate the fact that an error has occurred in the transmitted packets (S530). The base station can allocate resources to the mobile station so that the mobile station 1 retransmits the packets having an error at the designated time. At this time, the base station transmits the uplink basic assignment A-MAP IE to the mobile station 1 to allocate resources having information (for example, different position or different size) different from that of resources most recently allocated for corresponding ACID (S540). Since scheduling is performed in a subframe unit, the NACK signal at the step S530 and the uplink basic assignment A-MAP IE at the step S540 can be transmitted to the mobile station 1 at the same time.

However, since the mobile station 1 has not successfully received the uplink basic assignment A-MAP IE which has allocated the region B for retransmission at the step S540, the mobile station 1 cannot retransmit data through the region B. Accordingly, since an uplink signal (or burst) does not exist at the resource region (region B) allocated by the uplink basic assignment A-MAP (S550), the base station can transmit the uplink basic assignment A-MAP IE, which has allocated the region B as the resource region for retransmission, to the mobile station 1 (S560). At this time, unlike FIG. 5, the base station does not transmit the NACK signal to the mobile station 1. The mobile station 1 which has received the uplink basic assignment A-MAP IE from the base station can transmit retransmission data through the resource region (region B) indicated by the IE (information element) (S570). If the base station successfully receives retransmission data through the region (region B) allocated from the mobile station 1 to the uplink basic assignment A-MAP IE, it can transmit the ACK signal to the mobile station 1 (S580).

As described above, if the base station does not receive burst from the region allocated from the mobile station or an error occurs in the packets transmitted to the allocated region after transmitting the uplink basic assignment A-MAP IE to the mobile station to allocate uplink resources for retransmission, it allocates a resource, which can transmit retransmission packets, to the mobile station 1 and transmits the resource to the base station through the uplink basic assignment A-MAP IE, whereby waste of unnecessary resources due to continuous failure in packet transmission, which is caused by the error of the uplink basic assignment A-MAP IE for retransmission, can be avoided.

Figure 6:
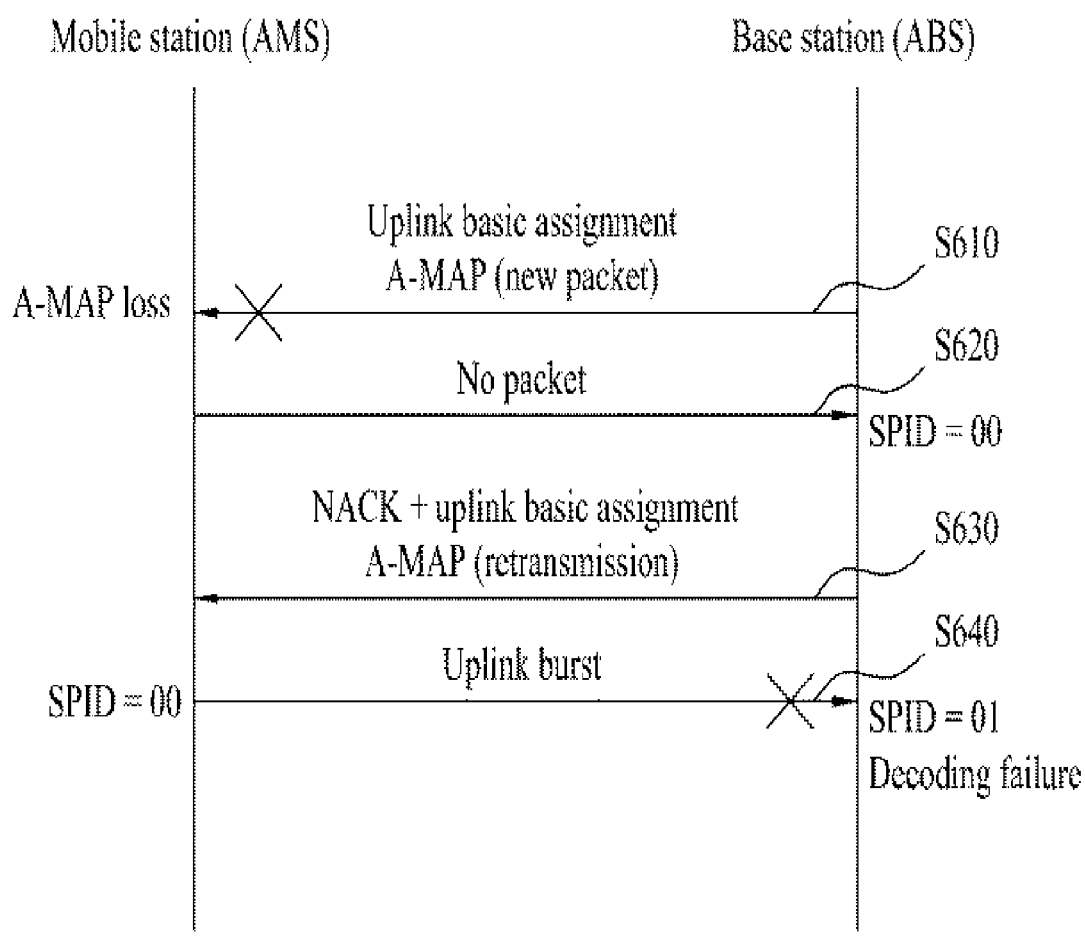
FIG. 6 is a diagram illustrating that an error occurs in HARQ sub-packet transmission due to non-synchronization of sub-packet identifier (SPID) in an IEEE 802.16 system, wherein non-synchronization is caused by A-MAP error.

FIG. 6 is a diagram illustrating that an error occurs in HARQ sub-packet transmission due to non-synchronization of subpacket identifier (SPID) in an IEEE 802.16 system, wherein the non-synchronization is caused by A-MAP error.

Referring to FIG. 6, the mobile station can receive the uplink basic assignment A-MAP IE from the base station to transmit a new packet. However, if the mobile station fails to decode the A-MAP information or the A-MAP information is damaged (or lossed) (S610), it may not transmit the packet to the base station (S620). In the step S610, the base station knows a value of the sub-packet identifier (SPID) for the new packet as '00'. However, since the A-MAP information has been damaged (or lost), the mobile station cannot transmit the packet (sub-packet, burst, etc.) on the uplink, and receives the NACK signal and the uplink basic assignment A-MAP IE for retransmission from the base station after a certain time passes (S630). Also, since the mobile station has not received the A-MAP information, it recognizes new transmission through AI_SN (HARQ identifier sequence number) and transmits a subpacket labeled (or set) SPID '00' to the base station.

However, since the base station has performed retransmission, it regards that the mobile station has transmitted SPID '01', and attempts to decode the sub-packet. However, since the base station attempts to decode the sup-packet using wrong SPID (i.e, '01'), it will fail to perform burst decoding (S640). In this case, a problem occurs in that a packet error may occur continuously. This problem could lead to waste of unnecessary uplink resources.

Basic operation of synchronous HARQ operation will be described.

If there is no transmission of the uplink basic assignment A-MAP IE, uplink resources for retransmission can be allocated to the same resource index as that of the previous uplink allocation at a predetermined subframe. According to a rule for uplink sub-packet transmission, the mobile station transmits a sub-packet labeled with a value of '0b00' during initial transmission. Also, the mobile station may transmit one among subpackets labeled '0b00', '0b01', '0b10', and '0b11' in sequential order to the base station. Also, if the mobile station receives control information (e.g, the uplink basic assignment A-MAP) for uplink retransmission, it can set a value of HARQ SPID for uplink transmission to '00' (i.e., '0b00') regardless of transmission number (i.e., as to initial transmission or retransmission) indicated by the control information, and transmit the subpacket labeled '0b00' regardless of transmission number to the base station.

Figure 7:
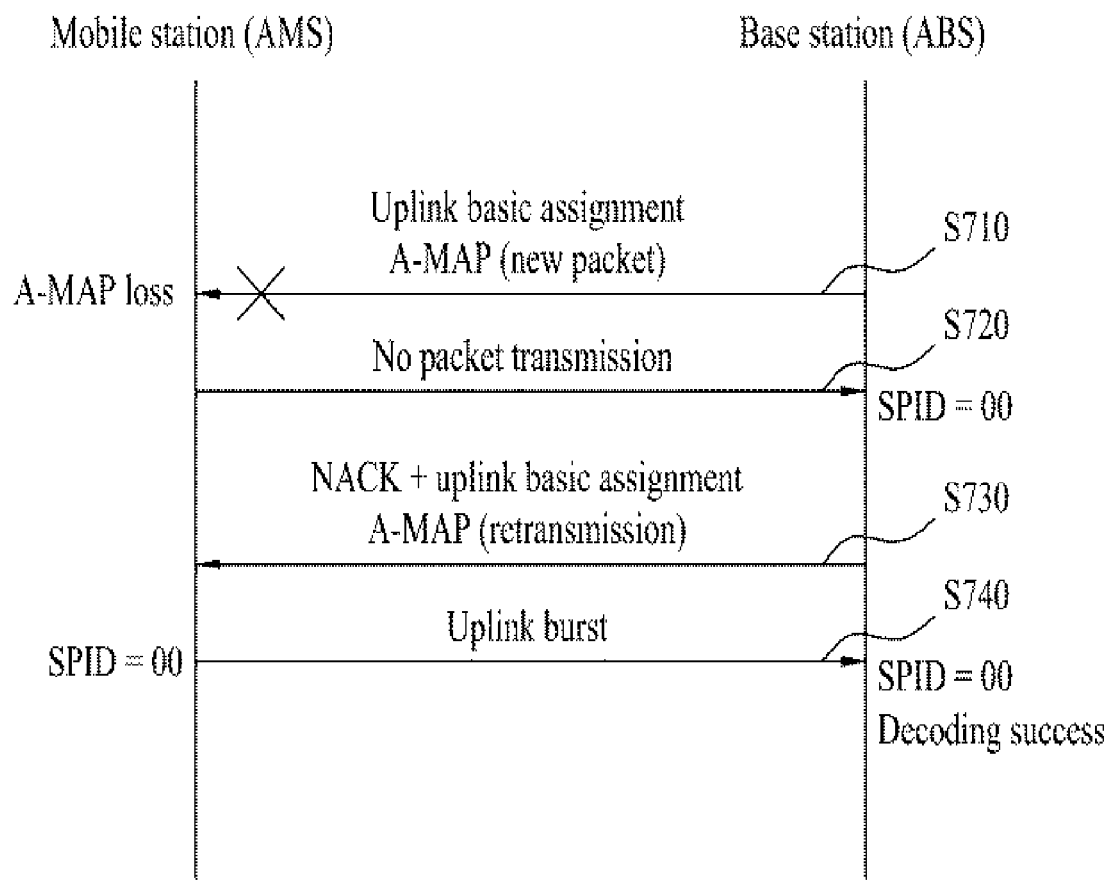
FIG. 7 is a diagram illustrating an example of a method for solving a non-synchronization problem of sub-packet identifier (SPID) in an IEEE 802.16 system, wherein non-synchronization is caused by A-MAP error.

FIG. 7 is a diagram illustrating an example of a method for solving a non-synchronization problem of sub-packet identifier (SPID) in an IEEE 802.16 system, wherein non-synchronization is caused by A-MAP error.

Referring to FIG. 7, the mobile station can receive the uplink basic assignment A-MAP IE from the base station to transmit a new packet. However, if the mobile station fails to decode the A-MAP information or the A-MAP information is damaged (or lost) (S710), it may not transmit the packet to the base station (S720). In the step S710, the base station knows a value of the sub-packet identifier (SPID) for the new packet as '00'. However, since the A-MAP information has been damaged (or lost), the mobile station cannot transmit the packet (sub-packet, burst, etc.) to the uplink, and receives the NACK signal and the uplink basic assignment A-MAP IE for retransmission from the base station after a certain time passes (S730). Also, since the mobile station has not received the A-MAP information, it recognizes new transmission through AI_SN (HARQ identifier sequence number) and transmits a subpacket labeled SPID '00' to the base station (S740). At this time, the base station can recognize whether the mobile station has received the A-MAP, through power detection of uplink burst. Also, the base station can increase the sub-packet identifier (SPID) value only if it is determined that the mobile station has successfully received the A-MAP, through power detection of uplink burst.

For example, if the base station fails to perform power detection of uplink burst for the first A-MAP, it supposes that the mobile station has not received the A-MAP. When the base station allocates uplink resources using A-MAP for next retransmission, it can set the sub-packet identifier value of retransmission uplink burst to '00' (i.e., 0b00). In this case, the sub-packet identifier values of the packets transmitted and retransmitted from the mobile station and the base station become identical with each other, whereby the problem of the continuous packet error can be solved basically.

At this time, as another method, the base station may always set the sub-packet identifier (SPID) value of the uplink burst transmitted through the resource allocated by the uplink basic assignment A-MAP to the initial value '00' regardless of new transmission (or initial transmission) or retransmission. In other words, as described above, if the mobile station receives the uplink basic assignment A-MAP, which is the control information for uplink transmission, from the base station, it can set the HARQ SPID value for uplink transmission to '00' (i.e., '0b00') regardless of transmission number (e.g., as to initial transmission or retransmission) indicated by the control information and transmit the same to the base station.

As described above, if the mobile station receives the control information (for example, uplink basic assignment A-MAP IE) from the base station, it always sets the HARQ SPID value to '00' (i.e., 0b00) regardless of transmission number (e.g, whether the control information is for initial transmission or retransmission) and then perform uplink transmission. As a result, the problem occurring as the base station fails to receive the uplink sub-packets of the mobile station due to inconsistency of the HARQ sub-packet identifier with the base station can be solved basically. To specify a method for notifying start of initial transmission (new transmission), it may be considered that 1 bit HARQ identifier sequence number (AI_SN) is toggled through every new HARQ transmission attempt on the same ACID. If the AI_SN is changed, a receiver can take corresponding HARQ attempt belonging to a new encoder packet without previous HARQ attempt having same ACID.

Figure 8:
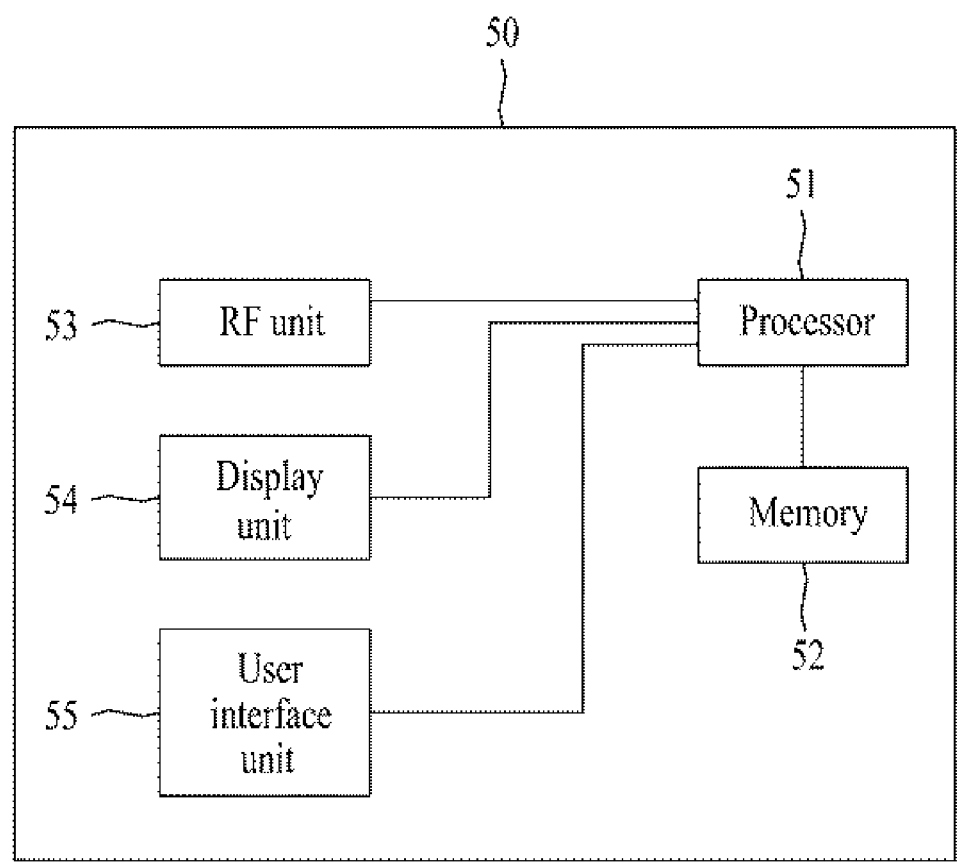
FIG. 8 is a diagram illustrating elements of a device 50.

FIG. 8 is a diagram illustrating elements of a device 50. The device 50 may be a mobile station or a base station. Also, the device 50 includes a processor 51, a memory 52, a radio frequency (RF) unit 53, a display unit 54 and a user interface unit 55. Layers of a physical interface protocol are implemented within the processor 51.

The processor 51 provides a control plane and a user plane. A function of each layer can be implemented within the processor 51. The memory 52 is electrically connected with the processor 51 and stores an operating system, an application program, and general files. If the device 50 is a user equipment (UE), the display unit 54 can display various kinds of information, and can be implemented using LCD (Liquid Crystal Display), OLED (Organic Light Emitting Diode), etc., which are known.

The user interface unit 55 can be configured by combination of well known user interfaces such as key pad and touch screen. The RF unit 53 is electrically connected with the processor 51 and transmits or receives a radio signal. The RF unit 53 includes a transmitting module (not shown) and a receiving module (not shown). The RF unit 53 receives control information, which includes zone allocation information, from the base station, and the processor 51 controls the user equipment device 50 to perform communication with the base station through a corresponding zone based on the zone allocation information.

Layers of the radio interface protocol between the mobile station and the network can be divided into a first layer (L1), a second layer (L2) and a third layer (L3) based on three lower layers of an open system interconnection (OSI) model which is well known in the communication system. A physical layer (or PHY layer) belongs to the first layer, and provides an information transmission service through a physical channel. A radio resource control (RRC) layer belongs to the third layer and provides control radio resources between the UE and the network. The UE and the network exchange RRC messages through the RRC layer.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

Apparatus and method for performing HARQ procedure is applicable to wireless communication system such as IEEE 802 system, 3GPP LTE, LTE-A system, and like that.

The invention claimed is:

1. A method for transmitting data in a wireless communication system, the method comprising:
   receiving, by a mobile station (MS) from a base station (BS), uplink control information for an uplink transmission;
   determining, by the MS, whether a type of the uplink control information is an uplink basic assignment A-MAP IE (Information Element) that include a resource assignment and an indicator indicating a start of new transmission or a start of a retransmission; and
   when the type of the uplink control information is the uplink basic assignment A-MAP IE, transmitting, by the MS to the BS, a subpacket having a predetermined label through a resource indicated by the uplink basic assignment A-MAP IE regardless of whether the indicator indicates the start of the new transmission or the start of the retransmission.

2. The method of claim 1, wherein the predetermined label is '0b00'.

3. The method of claim 1, wherein the resource indicated by the uplink basic assignment A-MAP IE is different from a resource assigned for a previous transmission when the resource assignment is for the retransmission.

4. The method of claim 3, wherein the resource assignment includes a location of the resource indicated by the uplink basic assignment A-MAP IE and a size of the resource indicated by the uplink basic assignment A-MAP IE.

5. A mobile station (MS) apparatus configured to transmit data in a wireless communication system, the MS apparatus comprising:
   a radio frequency (RF) unit; and
   a processor operatively connected to the RF unit and configured to
      receive, from a base station (BS), uplink control information for an uplink transmission;
      determined whether a type of the uplink control information is an uplink basic assignment A-MAP IE (Information Element) that includes a resources assignment and an indicator indicating a start of a new transmission or a start of a retransmission; and
      when the type of the uplink control information is the uplink basic assignment A-MAP IE, transmit to the BS a subpacket having a predetermined label through a resource indicated by the uplink basic assignment A-MAP IE regardless of whether in the indicator indicates the start of the new transmission of the start of the retransmission.

6. The MS apparatus of claim 5, wherein the predetermined label is '0b00'.

7. The MS apparatus of claim 5, wherein the resource indicated by the uplink basic assignment A-MAP IE is different from a resource assigned for a previous transmission when the resource assignment is for the retransmission.

8. The MS apparatus of claim 7, wherein the resource assignment includes a location of the resource indicated by the uplink basic assignment A-MAP IE and a size of the resource indicated by the uplink basic assignment A-MAP IE.

* * * * *